(12) United States Patent
Hanes

(10) Patent No.: US 11,209,920 B2
(45) Date of Patent: Dec. 28, 2021

(54) USER INTERFACES WITH STRIKE SENSORS

(71) Applicant: Hewlett-Packard Development Company, L.P., Spring, TX (US)

(72) Inventor: David H Hanes, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/648,716

(22) PCT Filed: Oct. 4, 2017

(86) PCT No.: PCT/US2017/055040
§ 371 (c)(1),
(2) Date: Mar. 19, 2020

(87) PCT Pub. No.: WO2019/070249
PCT Pub. Date: Apr. 11, 2019

(65) Prior Publication Data
US 2020/0225775 A1    Jul. 16, 2020

(51) Int. Cl.
*G06F 3/039* (2013.01)
*G06F 3/01* (2006.01)

(52) U.S. Cl.
CPC ............ *G06F 3/0395* (2013.01); *G06F 3/016* (2013.01)

(58) Field of Classification Search
CPC ... G06F 2200/1636; G06F 2203/04105; G06F 3/016; G06F 3/0395; G06F 3/04883
See application file for complete search history.

(56) References Cited

U.S. PATENT DOCUMENTS

| 7,336,266 B2 | 2/2008 | Hayward et al. |
| 7,358,956 B2 | 4/2008 | Hinckley et al. |
| 8,316,319 B1* | 11/2012 | Patel ................. G06F 3/04883 715/810 |
| 8,624,839 B2 | 1/2014 | Peterson et al. |
| 9,013,405 B2 | 4/2015 | Kujawski et al. |
| 9,405,369 B2 | 8/2016 | Modarres et al. |
| 9,471,160 B2 | 10/2016 | Qian et al. |
| 2008/0111791 A1 | 5/2008 | Nikittin |
| 2008/0259029 A1* | 10/2008 | Yang .................... G06F 3/0317 345/158 |
| 2011/0050576 A1* | 3/2011 | Forutanpour ....... G06F 3/04886 345/168 |

(Continued)

FOREIGN PATENT DOCUMENTS

| CN | 2726005 | 9/2005 |
| CN | 204066040 U | 12/2014 |

OTHER PUBLICATIONS

"Force Click with Force Touch Trackpad", Oct. 28, 2016, 3 pages, https://support.apple.com/en-in/HT204352.

*Primary Examiner* — Chun-Nan Lin
(74) *Attorney, Agent, or Firm* — Fabian VanCott

(57) ABSTRACT

In one example in accordance with the present disclosure, a user interface system is described. The system includes a user interface surface. A strike sensor disposed on an underside of the user interface surface detects a strike to the user interface surface and distinguishes between movement of the user interface device along the user interface surface and a strike to the user interface surface. A haptic feedback device generates haptic feedback responsive to a detected strike.

20 Claims, 7 Drawing Sheets

(56) References Cited

U.S. PATENT DOCUMENTS

| | | | |
|---|---|---|---|
| 2011/0195781 A1 | 8/2011 | Chen et al. | |
| 2012/0098789 A1* | 4/2012 | Ciesla | G06F 3/016 345/174 |
| 2013/0070074 A1* | 3/2013 | Won | G02B 6/12002 348/77 |
| 2015/0067497 A1* | 3/2015 | Cieplinski | G06F 3/04883 715/702 |
| 2015/0169096 A1* | 6/2015 | Nishizawa | G06F 3/0346 345/173 |
| 2015/0317027 A1* | 11/2015 | Du | G06F 3/048 345/173 |
| 2018/0232053 A1* | 8/2018 | Hamabata | B60K 35/00 |
| 2019/0077261 A1* | 3/2019 | Choi | B60K 37/02 |

\* cited by examiner

USER INTERFACES WITH STRIKE SENSORS

BACKGROUND

User interface devices allow a user to interact with a computing device. Examples of such user interface devices include a keyboard, a mouse, and a touch-screen display, among others. In one specific example, a user interface device, such as a mouse, is moved about on a surface that accommodates the fluid, and easy, movement of the mouse. Movement of the mouse, as well as depressions of buttons on the mouse, are received as input into the computing device and execute tasks on the computing device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
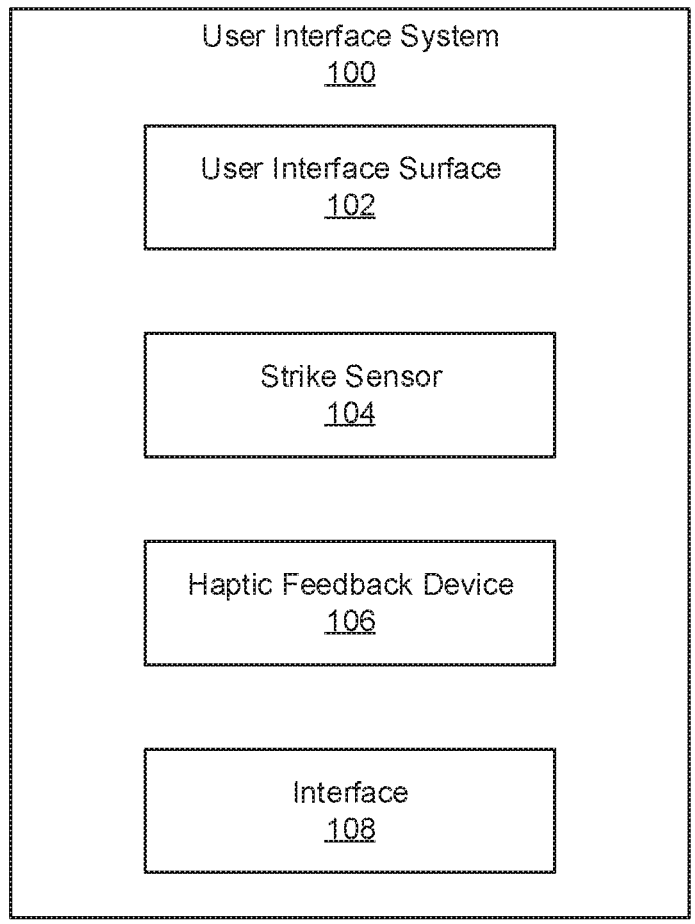
FIG. 1 is a block diagram of a user interface system with strike sensors, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

User interface devices allow a user to interact with a computing device. Examples of such user interface devices include a keyboard, a mouse, and a touch-screen display, among others. In one specific example, a user interface device, such as a mouse, is moved about on a surface that accommodates the fluid, and easy, movement of the mouse. Movement of the mouse, as well as depressions of buttons on the mouse, are received as input into the computing device and execute tasks on the computing device. The interface surface, which may be referred to as a mouse pad, may provide a smooth surface on which a mouse moves, thus providing a more enhanced experience as compared to other surfaces, such as a desktop.

While mouse pads offer some benefit to a user, enhanced functionality of these mouse pads may provide a more immersive, and satisfying, experience for a user. For example, in today's marketplace, computer gaming is a growing industry. The user interface devices described above allow user interaction with the computer game. Feedback to the user, such as dialogue, enhance a user's experience within the game; making the user feel more immersed in the gaming environment. One form of feedback is haptic feedback, which indicates a physical feedback. Haptic feedback can be in the form of vibration, which when coordinated with the computer game, can further increase the immersive experience of a user within a computer game. While specific reference is made to haptic feedback in relation to a computer game, the haptic feedback is relevant to other applications, or operations, of the computing device as well.

The present specification describes a user interface system. The user interface system includes a surface on which a user interface device, such as a mouse, is supported. The user interface system provides haptic feedback through the surface. The user interface system also provides additional sources of user input. More specifically, the user interface system includes strike sensors disposed under the surface. The strike sensors detect a strike to the surface and can execute an action, within the game or other application, on the computing device. Such an action may be pre-programmed, meaning the action emulates a key stroke and/or mouse command. In another example, the action is programmed, for example by the user. That is, the user may designate a new and specific action to carry out responsive to a strike to the user interface surface.

In this example, the haptic feedback may not only be tied to the application running on the computing device, but may be tied to detected strikes. That is, haptic feedback may be provided responsive to a detected strike on the user interface surface. In this fashion, the user interface system of the present specification provides greater functionality. That is, rather than merely being a surface on which a mouse moves, a user interface system as described herein allows a user to strike the user interface surface to operate much like a keystroke, mouse click, or voice command. In some examples, the functions carried out by striking the user interface surface are definable by the user such that any type, and any number, of functions can be carried out by striking the user interface surface.

Specifically, the present specification describes a user interface system. The user interface system includes a user interface surface on which a user interface device is to be supported. A strike sensor is disposed on an underside of the user interface surface. The strike sensor 1) detects strikes to a topside of the user interface surface and 2) distinguishes between movement of the user interface device along the user interface surface and a strike to the user interface surface. A haptic feedback device is disposed on an underside of the user interface surface. The haptic feedback device generates haptic feedback responsive to a detected strike. An interface of the user interface system transmits data to and from a controller.

The present specification also describes a method. According to the method, multiple regions on a user interface surface are identified and associated with different tasks associated with each region. Data is received from multiple strike sensors disposed on an underside of the user interface surface. Based on the data, movement of the user interface device along the user interface surface is distinguished from a strike to the user interface surface. Also based on the data, a region where the strike occurred is detected. Haptic feedback is then generated responsive to a detected strike.

The present specification also describes a non-transitory machine-readable storage medium encoded with instructions executable by a processor. The machine-readable storage medium includes instructions to identify multiple regions on a user interface surface; wherein each region is associated with a different task; instructions to receive data from multiple strike sensors disposed on an underside of the user interface surface; instructions to distinguish, based on the data, between a movement along the user interface surface and a strike to the user interface surface; instructions to determine, based on the data, a region where a strike occurred; and instructions to generate haptic feedback responsive to a detected strike.

In summary, using such a user interface system 1) provides an additional source of input to a computing device; 2) provides an efficient source of input as a user's hand is already in the vicinity of the user interface surface while controlling the user interface device; 3) provides haptic acknowledgement that an input command was received; 4) provides a more immersive user experience via haptic feedback; and 5) is customizable by a user to carry out any function, or any number of functions. However, it is contemplated that the devices disclosed herein may address other matters and deficiencies in a number of technical areas.

As used in the present specification and in the appended claims, the term "haptic feedback" refers to feedback of a physical form. For example, haptic feedback may include vibrations generated in the user interface surface that are felt by a user resting a portion of their hand on the user interface surface.

Further, as used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

FIG. 1 is a block diagram of a user interface system (100) with a strike sensor (104) and haptic feedback, according to an example of the principles described herein. The user interface system (100) includes a user interface surface (102). The user interface surface (102) supports a user interface device, such as a mouse. Accordingly, the user interface surface (102), or at least a portion thereof, may be formed of a material that allows the user interface device, or mouse, to easily move across it. For example, the user interface surface (102) may include a flexible plastic or rubber top layer that has a low coefficient of friction on which the user interface device slides. The user interface surface (102) may include an underside that has a higher coefficient of friction, for example another form of rubber, which grips with the desk, or other surface, on which the user interface surface (102) is placed during operation. The user interface surface (102) may be flexible such that it may contour to non-flat surfaces.

Disposed on an underside of the user interface surface (102) is a strike sensor (104), or multiple strike sensors (104). The strike sensors (104) may be disposed within the rubber material that forms the underside. The strike sensors (104) may be relatively thin, for example 1 millimeter (mm) thick, 1.5 mm thick, 0.5 mm thick, 2 mm thick, 2.5 mm thick, and 3 mm thick, such that they do not increase the overall thickness of the user interface surface (102). The strike sensors (104) detect strikes to the topside of the user interface surface (102). For example, the strike sensors (104) may be pressure sensors that can detect force on the topside of the user interface surface (102) and output a voltage, or other signal, indicative of the detected force.

The strike sensors (104) can also distinguish between movement of the user interface device along the user interface surface (102) and a strike to the user interface surface (102). For example, movement of the user interface device, e.g., a mouse, may result in strikes to the user interface surface (102). Moreover, it may occur that a user lifts the user interface device to re-position the user interface device. Such lifting and placement on the user interface surface (102), which may not be intended to trigger haptic feedback or execute a computing task, may be confused with a strike, for example by a user's finger, which may be intended to trigger haptic feedback and/or execute a computing task. Accordingly, the strike sensors (104) are trained to distinguish these different types of actions. Such training may occur in a calibration mode for the strike sensors (104). That is, before a strike to the user interface surface (102) is recognized as a trigger to an action, a calibration mode may be entered wherein a particular strike sensor (104) is calibrated to distinguish between a particular user interface device of the user and the user's intentional strike. In some examples, the user participates in the calibration. For example, a display may notify a user that the strike sensors (104) are in a calibration mode and may instruct the user to perform different actions such as sliding the mouse, lifting the mouse, tapping the striking the user interface surface (102) with a finger, palm, etc. In another example, such calibration may be performed during the normal course of use. For example, the strike sensor (104) may have a training period wherein a user normally uses the mouse, but data is collected regarding lifting, sliding, and impact strength during the use of a mouse. Such calibration may be improved over time as a user continually operates the mouse on the user interface surface (102).

Such calibration may be different for each user and user interface device. Such a calibration thereby allows the user interface system (100) and associated controls to be tailored to an individual environment, e.g., user interface device and user ergonomics.

The user interface surface (102) also includes a haptic feedback device (106) disposed on the underside of the user interface surface (102). The haptic feedback device (106) generates haptic feedback responsive to a detected strike. In this example, the responsive haptic feedback may verify to a user that the operation associated with the strike has been executed. The haptic feedback device (106) may be any component that provides a haptic, or tactile, feedback to the user. Examples of haptic feedback include movement and vibration. For example, responsive to a detected strike, the haptic feedback device (106) may vibrate, which vibration is felt throughout the user interface surface (102), thus providing feedback. The haptic feedback device (106) may be a DC motor that, responsive to an applied voltage, spins thus causing the vibrations felt by the user. For example, the DC motor may have an offset shaft internally such that when the shaft rotates, a plate that is coupled to the shaft is shaken. In this example, different voltage values can be applied to generate more or less vibration. Applying different voltage values can also result in faster, slower, or different vibration patterns.

The user interface system (100) also includes an interface (108), which may be disposed within the user interface surface (102) that transmits data to and from a controller. For example, the strike sensors (104) may output voltages or other signals to the controller, which voltage, or other signals, trigger an operation or series of operations. Via the interface (108), a voltage, or other signal, passes from the controller to trigger engagement of the haptic feedback device (106). In some examples, the interface (108) may be a wired interface, such as a USB cable. In other examples, the interface (108) may be wireless, such as a Bluetooth® radio.

The user interface system (100) as described herein provides strike sensors (104) and a haptic feedback device (106) to a surface. Doing so increases user experience. For example, in the field of computer gaming, a user may be looking for a more immersive experience. The haptic feedback via the haptic feedback device (106) may be tied to elements of the game, including explosions. The vibration by the haptic feedback device (106) thereby provides a more immersive experience as a user can feel the effects and feel more engaged in the game.

The strike sensors (104) also provide enhanced functionality. Still in regards to computer gaming, a user may be able to configure operations to be carried out when a strike is detected. In some cases, a user may configure multiple operations to be carried out when a strike is detected. Accordingly, a user can configure a strike to trigger a key combination such that the user can perform complex game functions with a single strike or combinations of strikes. For example, a first function could be triggered by a single tap, a second function by a double tap, a third function by a triple tap, and a fourth function of a long tap followed by a short tap. In other words, a wide variety of functions, in a gaming situation or other, can be performed using any number and combination of strikes having any number of strike characteristics.

Outside of the gaming field, overall user interaction is increased by such a system (100). That is, the strikes detected by the strike sensors (104) can emulate key strokes or mouse commands. As the user interface surface (102) is near a users hand, for example, as they are using the mouse, it may be more efficient for a user to strike a user interface surface (102) rather than move over to the keyboard to execute a keystroke.

Figure 2:
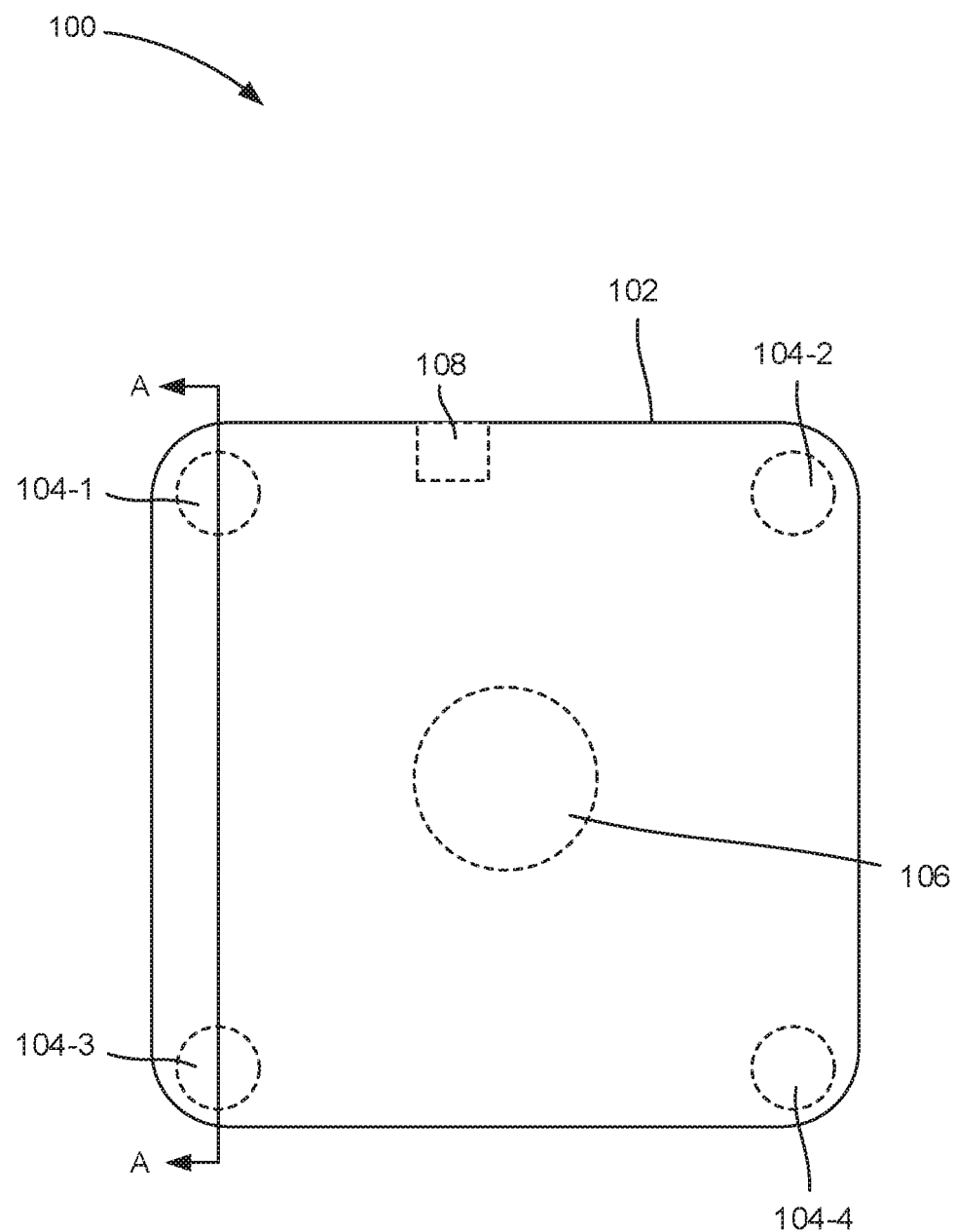
FIG. 2 is a top view of a user interface system with strike sensors, according to an example of the principles described herein.

FIG. 2 is a top view of a user interface system (100) with strike sensors (104-1, 104-2, 104-3, 104-4, collectively referred to herein as 104) and haptic feedback, according to an example of the principles described herein. In FIG. 2, the strike sensors (104-1, 104-2, 104-3, 104-4), haptic feedback device (106), and interface (108) are indicated in dashed lines to indicate their placement on an underside, or within the user interface surface (102).

As indicated in FIG. 2, in some examples, the user interface surface (102) includes multiple strike sensors (104). The strike sensors (104) may be placed at various locations on the bottom of the user interface surface (102). For example, the user interface surface (102) may be square, and the strike sensors (104) may be placed at the corners of the square user interface surface (102). In other examples, the user interface surface (102) may be any shape, and the strike sensors (104) may be placed around the borders of the user interface surface (102). In this configuration, a strike may be detected by the multiple strike sensors (104), and a location of the strike may be calculated based on the relative voltage value received by each of the strike sensors (104) as well as the timing of such received voltage. That is a strike sensor (104) closest to the strike will detect the strike first. While FIG. 2 depicts the strike sensors (104), haptic feedback device (106), and interface (108) disposed at various locations relative to the user interface surface (102), such components may be placed at any location. Moreover, while FIG. 2 depicts a particular number of strike sensors (104) and haptic feedback device(s) (106), any number of these components may be found within the user interface system (100).

Figure 3:
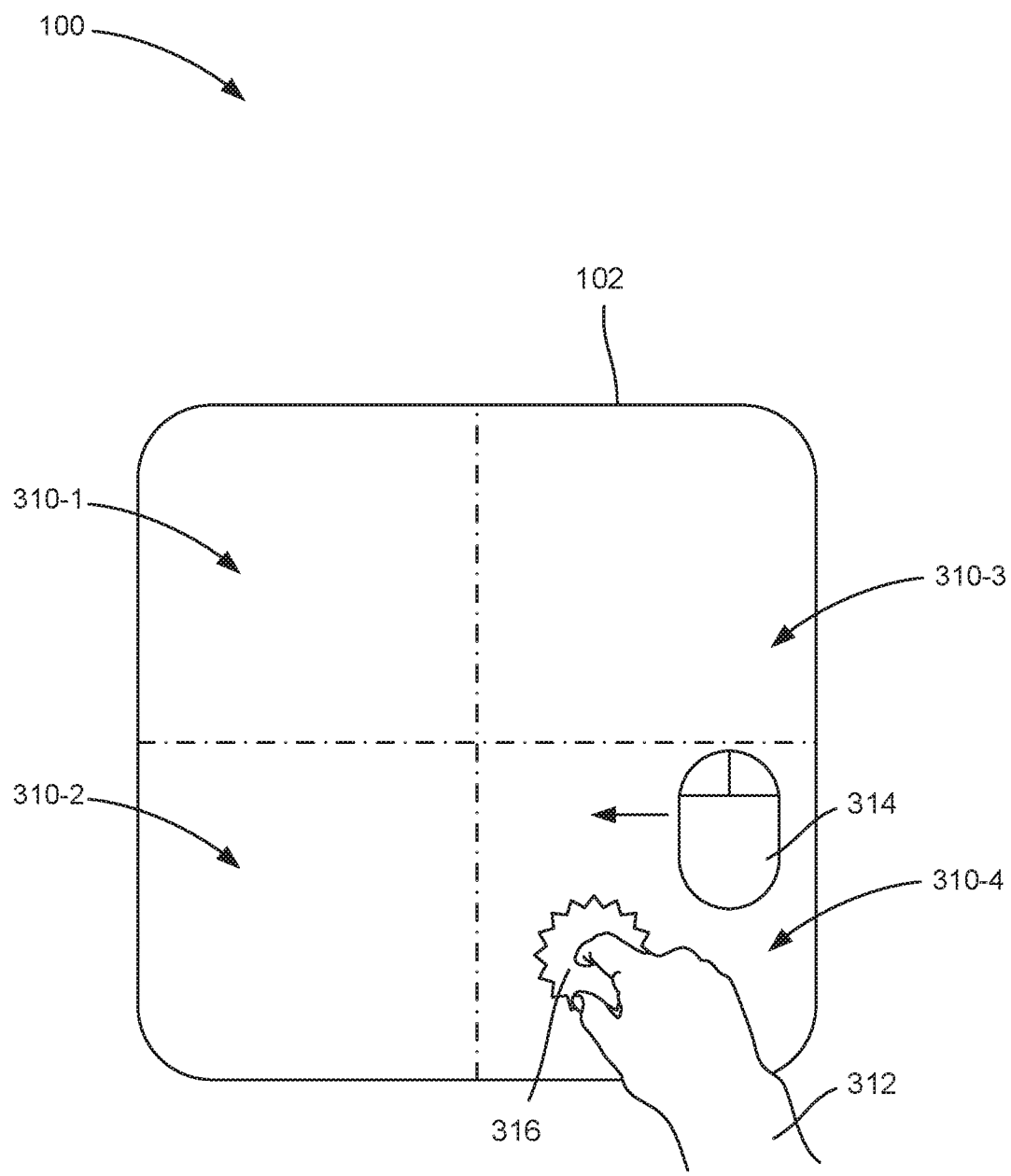
FIG. 3 is a top view of a user interface system with strike sensors, according to an example of the principles described herein.

FIG. 3 is a top view of a user interface system (100) with strike sensors (FIG. 1, 104) and haptic feedback, according to an example of the principles described herein. For simplicity, in FIG. 3 various components including the strike sensors (FIG. 1, 104), haptic feedback device (FIG. 1, 106), and interface (FIG. 1, 108) have not been indicated. In some examples, the user interface surface (102) may be divided into different regions (310-1, 310-2, 310-3, 310-4, collectively referred to herein as 310) with each region (310) being associated with a different task. In FIG. 3, the regions (310) are identified by the dash-dot line.

As used in the present specification, a "task" refers to an emulation of a key stroke, multiple keystrokes, a mouse command, multiple mouse commands, or some other function executed on a computing device. While FIG. 3 depicts four regions (310), any number of regions (310) may be identified on the user interface surface (102).

Feedback from the different strike sensors (FIG. 1, 104) may allow a controller to determine in which region (310) a strike (316) occurs. That is, for any strike (316) on the user interface surface (102), each of the strike sensors (FIG. 1, 104) may output a voltage or other signal. However, the value of the voltage, or strength of the signal, is dependent upon a proximity of the strike (316) to that particular strike sensor (104). Accordingly, the relative strengths of signals received from each of the strike sensors (FIG. 1, 104) allows a controller to determine a region (310), and associated task, associated with the strike (316). In some examples, the user interface surface (102) may include visual demarcation of the various regions (310) of the user interface surface (102).

An example is provided below. In this example, a user (312) strikes (316) a region (310-4) of the user interface surface (102). The strike sensor (FIG. 2, 104-3) that is nearest the strike (316) would output a stronger signal relative to the other strike sensors (FIG. 2, 104-1, 104-2, 104-4). Based on information from each of the strike sensors (FIG. 2, 104-1, 104-2, 104-3, 104-4), the location of the strike (316) can be determined, and a region (310) in which the strike (316) occurred can be identified. The controller could then 1) execute a function associated with the region (310) and/or 2) provide haptic feedback responsive to the detected strike (316).

In some examples, the strike sensors (FIG. 1, 104) distinguish between a strike (316) to the user interface surface (102) and a movement of a user interface device (314), such as a mouse, along the user interface surface (102). That is, as a user interface device (314) moves across a region (310) of the user interface surface (102), a task associated with the region (310) may inadvertently be triggered. To prevent this, the strike sensors (FIG. 1, 104) may be calibrated during a calibration mode to distinguish between a strike (316) and movement of the user interface device (314) along the user interface surface (102). For example, the strike sensors (104) may be able to distinguish, based on an amount of force, a pattern of forces, a surface area for the force, or a length of time force is applied, between a movement of the user interface device (314) and a strike (316).

Moreover, the strike sensors (FIG. 1, 104) may also distinguish a strike from the user interface device (314) with a strike (316) by a user (312). For example, while moving a user interface device (314), a user may lift the user interface device (314) to position it on another portion of the user interface surface (102). In so doing, the user places the user interface device (314) on the user interface surface (102), which may result in detection of a strike. A strike by the user interface device (314) in such an operation may not be intended to carry out a task where as a strike (316) by a user (312) may be intended to carry out a task. Accordingly, based on size, strength, or other characteristics of the strike, the strike sensors (FIG. 1, 104) may distinguish between these two strikes.

Figure 4:
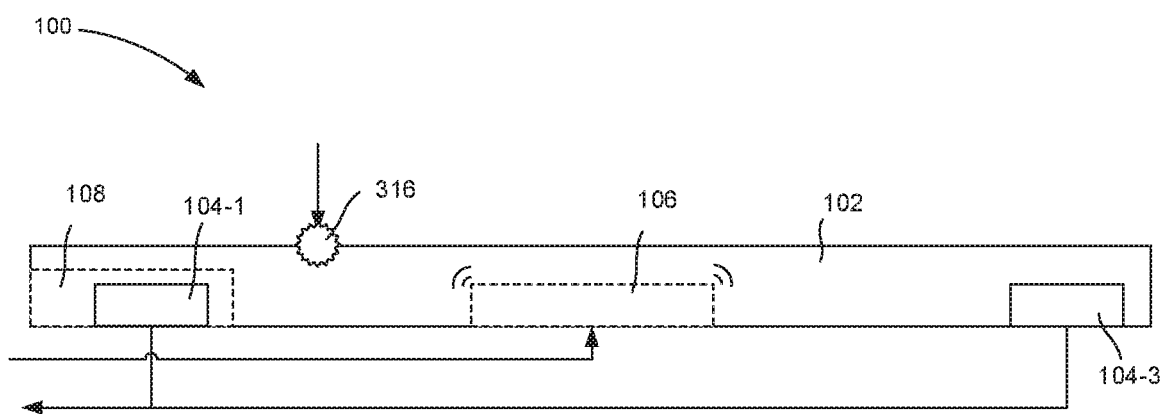
FIG. 4 is a cross-sectional view of a user interface system with strike sensors, according to an example of the principles described herein.

FIG. 4 is a cross-sectional view of a user interface system (100) with strike sensors (104) and haptic feedback, according to an example of the principles described herein. Specifically, FIG. 4 is a cross-sectional view taken along the line "A-A" in FIG. 2. The haptic feedback device (106) and interface (108) are indicated in dashed line to represent their placement interior to the user interface surface (102).

In some examples, the strike sensors (104) may be passive strike sensors (104) indicating they are not powered. For example, the strike sensors (104) may be piezoresistive sensors, A piezoresistive strike sensor (104) is a sensor that, upon detection of pressure, exhibits a change in registance, which change in resistance can be measured, e.g., by measuring the voltage of a voltage divider or bridge circuit. For example, as a strike (316) is detected, all of the strike sensors (104) will send a voltage, or other signal, to a controller. While particular reference is made to passive piezoresistive strike sensors (104), other types of strike sensors (104) may also be implemented, including micro-electro-mechanical sensors and piezoelectric sensors, among others. In some examples, the connection between the controller and the strike sensor (104) is a data transmission line, and there is no line to transmit power to the strike sensors (104).

The strike sensors (104) may not only be able to determine the location of a strike (316) but the strength of a strike (316). For example, a stronger strike (316) may result in higher output values as compared to output values associated with a weaker strike (316). The difference in detected strength may be used to 1) distinguish between a strike (316) by a user interface device (FIG. 3, 314) and a user (FIG. 3, 312) and/or 2) carry out different actions. That is, within a particular region (FIG. 3, 310), different strengths of strikes (316) can be associated with different actions, thus increasing the number of operations that can be carried out via striking the user interface surface (102). For example, a first function could be triggered by a single tap, a second function by a double tap, a third function by a triple tap, and a fourth function of a long tap followed by a short tap. In other words, a wide variety of functions, in a gaming situation or other, can be performed using any number and combination of strikes having any number of strike characteristics.

Responsive to detected strikes (316) or based on other criteria, the haptic feedback device (106) is activated. For example, the controller may send a voltage that turns on a motor, which motor vibrates to provide vibration to the entire user interface surface (102).

As described above, the haptic feedback may be based on more than just a detected strike (316). For example, within a computing game, the audio output of the computing game could be analyzed looking for particular frequencies or audio patterns, such as explosions. When a certain frequency or audio pattern is detected, the computing device may trigger the haptic feedback device (106) to activate.

In some examples, different strengths or patterns of haptic feedback can be generated. For example, based on the particular audio pattern from an application such as a computing game, or based on the strength of the strike (316), different associated strengths of vibration could be generated by the haptic feedback device (106).

Figure 5:
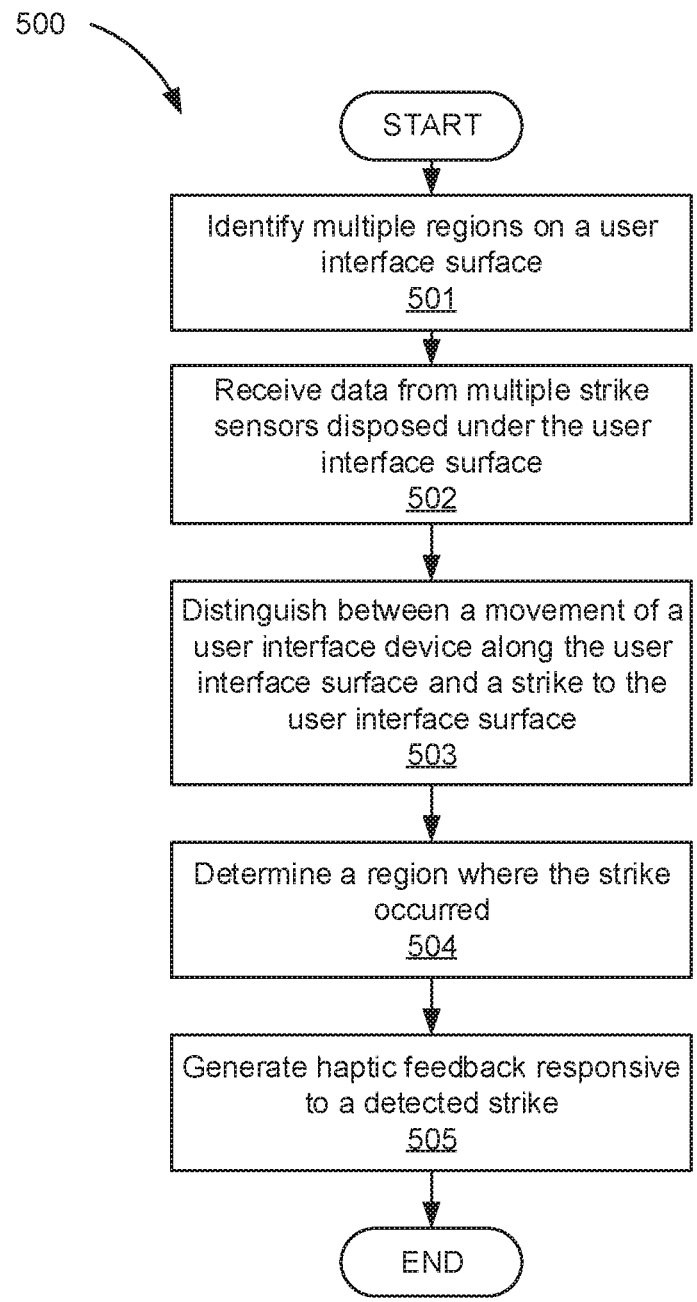
FIG. 5 is a flowchart of a method for interfacing with a surface with strike sensors, according to an example of the principles described herein.
Figure 6:
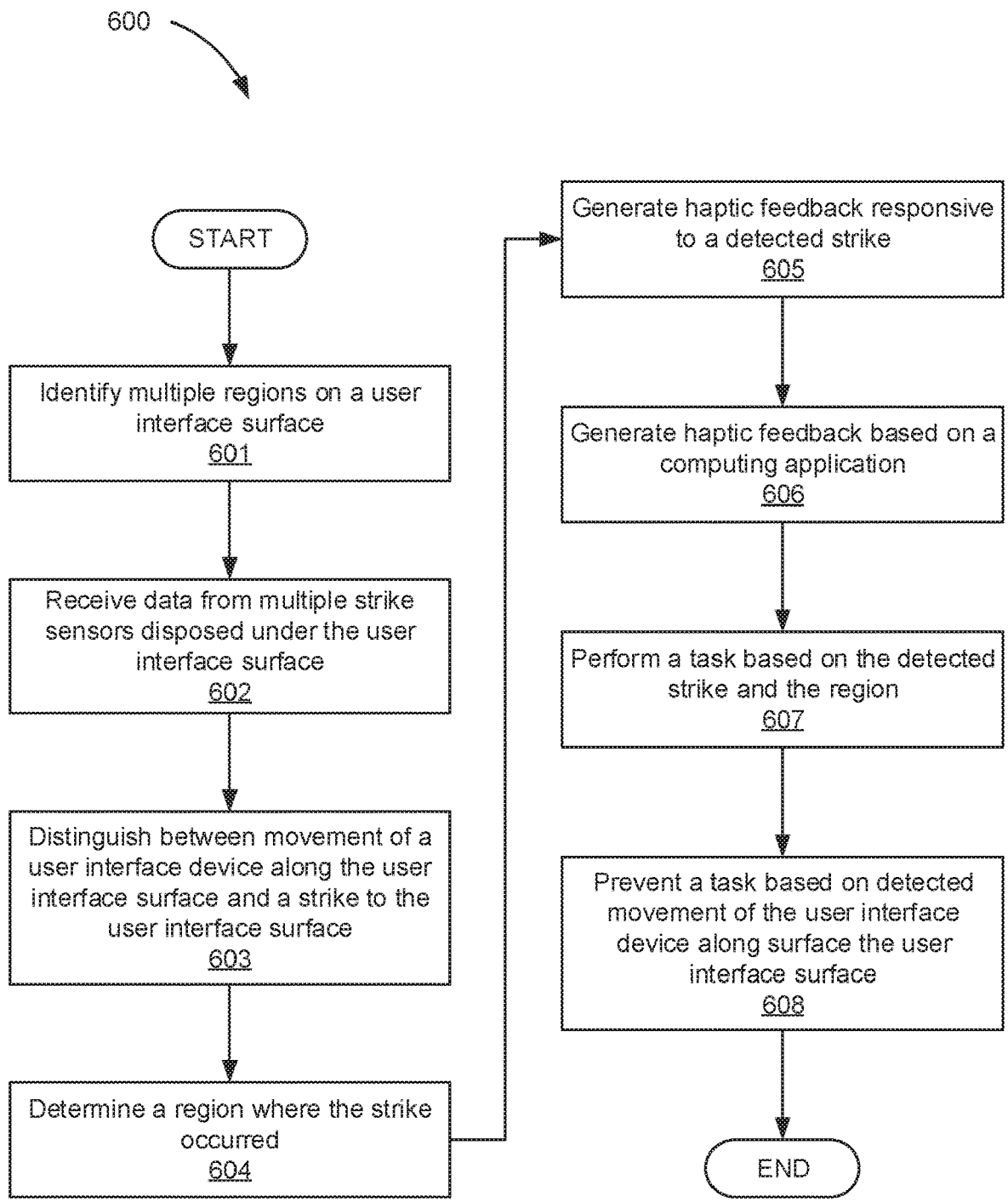
FIG. 6 is a flowchart of a method for interfacing with a surface with strike sensors; according to an example of the principles described herein.

FIG. 5 is a flowchart of a method (500) for interfacing with a user interface surface (FIG. 1, 102) with strike sensors (FIG. 1, 104) and haptic feedback, according to an example of the principles described herein. As a general note, the methods (500, 600) may be described below as being executed or performed by the surface and associated controller. Other suitable systems and/or controller may be used as well. The methods (500, 600) may be implemented in the form of executable instructions stored on at least one machine-readable storage medium of at least one of the devices and executed by at least one processor of at least one of the devices. Alternatively or in addition, the methods (500, 600) may be implemented in the form of electronic circuitry (e.g., hardware). While FIGS. 5 and 6 depict operations occurring in a particular order, a number of the operations of the methods (500, 600) may be executed concurrently or in a different order than shown in FIGS. 5 and 6. In some examples, the methods (500, 600) may include more or fewer operations than are shown in FIGS. 5 and 6. In some examples, a number of the operations of the methods (500, 600) may, at certain times, be ongoing and/or may repeat.

According to the method, multiple regions (FIG. 3, 310) are identified (block 501) on a user interface surface (FIG. 1, 102) of the user interface system (FIG. 1, 100). In this example, each of the identified regions (FIG. 3, 310) may correspond to a different action, or set of actions. For example, each of the regions (FIG. 3, 310) may emulate a different keystroke pattern or may emulate different game operations. In some examples, the user interface surface (FIG. 1, 102) may include colors, text, or other demarcation of the different regions (FIG. 3, 310).

Data is received (block 502) from the multiple strike sensors (FIG. 1, 104). The received data is indicative of a pressure force sensed by each of the strike sensors (FIG. 1, 104). In other words, each of the strike sensors (FIG. 1, 104) may send data for each instance of a strike (FIG. 3, 316). In some examples, the data may be a voltage value output by a passive strike sensor (FIG. 1, 104), which strike sensor (FIG. 1, 104) detected a pressure force.

From the data, a strike (FIG. 3, 316) to the user interface surface (FIG. 1, 102) is distinguished (block 503) from a movement of the user interface device (FIG. 3, 314) along the user interface surface (FIG. 1, 102). For example, during a calibration period, the strike sensor (FIG. 1, 104) may learn the difference between force characteristics of a movement and/or strike by a user interface device (FIG. 3, 314) and between force characteristics of a strike (FIG. 3, 316) by a user (FIG. 3, 312). Such differences may include differences in force strength, force duration, and a force pattern, among others. Such a calibration mode sets a baseline for actions that do not trigger task execution and/or haptic feedback and those actions that do trigger task execution and/or haptic feedback.

Also based on the data, a region (FIG. 3, 310) where the strike (FIG. 3, 316) occurred is determined (block 504). For example, as described above, the location of a strike (FIG. 3, 316) can be triangulated based on a combination of the outputs of each strike sensor (FIG. 1, 104). Haptic feedback associated with the detected strike (FIG. 3, 316) is then generated (block 505). That is, a vibration response associated with the detected strike (FIG. 3, 316) is generated (block 505). Such a haptic feedback indicates to a user (FIG. 3, 312) that a strike (FIG. 3, 316) was effectively received by the controller and that the associated task was, or will be, carried out.

FIG. 6 is a flowchart of a method (600) for interfacing with a user interface surface (FIG. 1, 102) with strike sensors (FIG. 1, 104) and haptic feedback, according to an example of the principles described herein. According to the method (600), multiple regions (FIG. 3, 310) on the user interface surface (FIG. 1, 102) are identified (block 601). This may be performed as described above in regards to FIG. 5. Data is received (block 602) from multiple strike sensors (FIG. 1, 104). This may be performed as described above in regards to FIG. 5. A strike to the user interface surface (FIG. 1, 102) is distinguished (block 603) from movement of the user interface device (FIG. 3, 314) along the user interface surface (FIG. 1, 102), and a region (FIG. 3, 310) where the strike (FIG. 3, 316) occurs is determined (block 604). This may be performed as described above in regards to FIG. 5. Haptic feedback is then generated (block 605) based on the detected strike. This may be performed as described above in regards to FIG. 5.

In some examples, haptic feedback is also generated (block 606) based on a computing application. For example, during gaming, audio signatures may be analyzed, and when particular patterns or frequencies within the signature are detected, haptic feedback may be generated (block 606). As described above, the strength of the generated haptic feedback may be based on different characteristics of the application running on the computing device. For example, louder audio signatures may result in a stronger haptic feedback.

In some examples, a task is performed (block 607) based on the detected strike (FIG. 3, 316) and region (FIG. 3, 310). For example, a strike (FIG. 3, 316) in one region (FIG. 3, 310-1) may trigger a first task, while a strike (FIG. 3, 316) of a second region (FIG. 3, 310-2), or a different strike pattern or strike force in the first region (FIG. 3, 310-1), may trigger a second task. In some examples, the actions are previously defined by a user (FIG. 3, 312). That is, a user (FIG. 3, 312) may bind keystroke combinations and/or mouse commands to a particular region (FIG. 3, 310) such that when a strike (FIG. 3, 316) occurs in that region (FIG. 3, 310), the combination of keystrokes and mouse commands indicated by the user (FIG. 3, 312) are executed. In some examples, a unique command, i.e., not emulation of a keystroke combination and/or mouse command, is associated with a particular region (FIG. 3, 310).

In some examples, the method (600) includes preventing (block 608) a task based on a detected movement of the user interface device (FIG. 3, 314) within a region (FIG. 3, 310). Put another way, the strike sensors (FIG. 1, 104) can distinguish between a strike (FIG. 3, 316) and a movement. Responsive to a detected strike (FIG. 3, 316) in a region (FIG. 3, 310), an action associated with that region (FIG. 3, 310) is carried out, but responsive to a detected movement, i.e., not a strike, within that region (FIG. 3, 310), the task associated with that region (FIG. 3, 310) is prevented (block 608) from execution.

Figure 7:
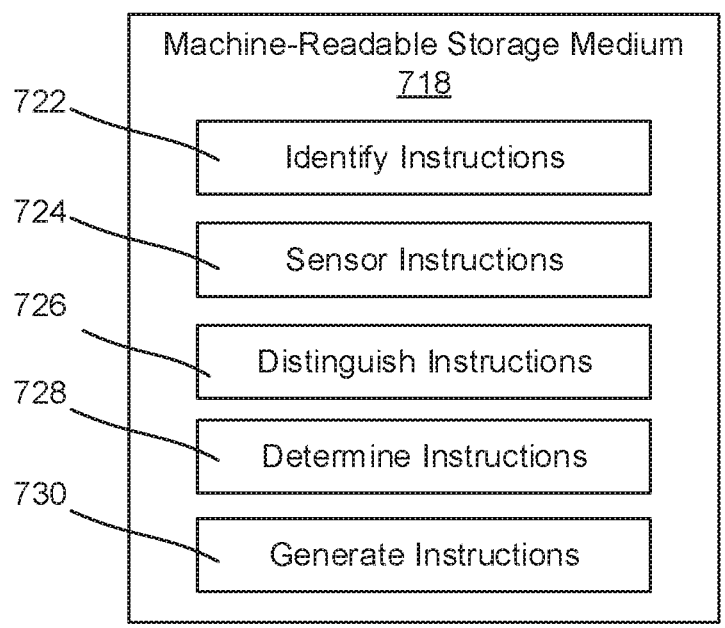
FIG. 7 is a diagram of a non-transitory machine-readable storage medium for interfacing with a surface with strike sensors, according to an example of the principles described herein.

FIG. 7 is a diagram of a non-transitory machine-readable storage medium (718) for interfacing with a user interface surface (FIG. 1, 102) with strike sensors (FIG. 1, 104) and haptic feedback, according to an example of the principles described herein.

To achieve its desired functionality, a computing system includes various hardware components. Specifically, the computing system includes a processor. Machine-readable storage medium (718) is communicatively coupled to the processor. The machine-readable storage medium (718) includes a number of instruction sets (722, 724, 726, 728, 730) for performing a designated function. The machine-readable storage medium (718) causes the processor to execute the designated function of the instruction sets (722, 724, 726, 728, 730).

Although the following descriptions refer to a single machine-readable storage medium (718), the descriptions may also apply to multiple machine-readable storage mediums. In such examples, the instruction sets (722, 724, 726, 728, 730) may be distributed (e.g., stored) across multiple machine-readable storage mediums.

The processor refers to at least one processor and other resources used to process programmed instructions. For example, the processor may be a number of central processing units (CPUs), microprocessors, and/or other hardware devices suitable for retrieval and execution of instructions stored in machine-readable storage medium (718). The processor may fetch, decode, and execute instructions (722, 724, 726, 728, 730) for controlling a user interface system (FIG. 1, 100) with strike sensors (FIG. 1, 104) and haptic feedback. In one example, the processor may include a number of electronic circuits comprising a number of electronic components for performing the functionality of a number of the instructions in the machine-readable storage medium (718). With respect to the executable instruction, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (718) represent generally any memory capable of storing data such as programmed instructions or data structures used by the computing system. The machine-readable storage medium (718) includes a machine-readable storage medium that contains machine-readable program code to cause tasks to be executed by the processor. The machine-readable storage medium (718) may be a tangible and/or non-transitory storage medium. The machine-readable storage medium (718) may be any appropriate storage medium that is not a transmission storage medium. For example, the machine-readable storage medium (718) may be any electronic, magnetic, optical, or other physical storage device that stores executable instructions. Thus, machine-readable storage medium (718) may be, for example, Random Access Memory (RAM), a storage drive, an optical disc, and the like. The machine-readable storage medium (718) may be disposed within the computing system. In this situation, the executable instructions may be installed on the computing system. In one example, the machine-readable storage medium (718) may be a portable, external or remote storage medium, for example, that allows the computing system to download the instructions from the portable/external/remote storage medium. In this situation, the executable instructions may be part of an installation package. As described herein, the machine-readable storage medium (718) may be encoded with executable instructions for interfacing with a user interface surface (FIG. 1, 102) with strike sensors (FIG. 1, 104) and haptic feedback.

Referring to FIG. 7, identify instructions (722), when executed by a processor, may cause the computing system to identify multiple regions (FIG. 3, 310) on a user interface surface (FIG. 1, 102), wherein each region (FIG. 3, 310) is associated with a different task. Sensor instructions (724), when executed by a processor, may cause the computing system to receive data from multiple strike sensors (FIG. 1, 104) disposed on an underside of the user interface surface (FIG. 1, 102). Distinguish instructions (726), when executed by a processor, may cause the computing system to distinguish, based on the data, between a movement of a user interface device (FIG. 3, 314) along the user interface surface (FIG. 1, 102) and a strike (FIG. 3, 316) to the user interface surface (FIG. 1, 102). Determine instructions (728), when executed by a processor, may cause the computing system to determine, based on the data, a region (FIG. 3, 310) where a strike (FIG. 3, 316) occurred. Generate instructions (730), when executed by a processor, may cause the computing system to generate haptic feedback responsive to a detected strike (FIG. 3, 316).

In some examples, the processor and machine-readable storage medium (718) are located within the same physical component, such as a server, or a network component. The machine-readable storage medium (718) may be part of the physical component's main memory, caches, registers, non-volatile memory, or elsewhere in the physical component's memory hierarchy.

In one example, the machine-readable storage medium (718) may be in communication with the processor over a network. Thus, the computing system may be implemented on a user device, on a server, on a collection of servers, or combinations thereof.

In summary, using such a user interface system 1) provides an additional source of input to a computing device; 2) provides an efficient source of input as a user's hand is already in the vicinity of the user interface surface while controlling the user interface device; 3) provides tactile acknowledgement that an input command was received; 4) provides a more immersive user experience via haptic feedback; and 5) is customizable by a user to carry out any function, or any number of functions. However, it is contemplated that the devices disclosed herein may address other matters and deficiencies in a number of technical areas.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium, the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A user interface system comprising:
   a user interface surface on which a user interface device is to be supported;
   a strike sensor disposed on an underside of the user interface surface to:
      detect strikes to a topside of the user interface surface; and
      distinguish between movement of the user interface device along the user interface surface and a strike to the user interface surface;
   a haptic feedback device disposed on an underside of the user interface surface to generate haptic feedback responsive to a detected strike; and
   an interface to transmit data to and from a computing device.

2. The user interface system of claim 1, wherein the interface is a wireless interface.

3. The user interface system of claim 1, wherein the strike sensor is a passive strike sensor that is not powered.

4. The user interface system of claim 1, wherein the strike sensor is a piezoresistive sensor that outputs a voltage value responsive to the detected strike.

5. The user interface system of claim 1, wherein the strike sensor is one of multiple strike sensors, each of which are placed around a border of the user interface surface.

6. The user interface system of claim 1, wherein the user interface surface is flexible.

7. The user interface system of claim 1, wherein the strike sensor, when in a calibration mode, is calibrated to distinguish between movement of the user interface device along the user interface surface and a strike to the user interface surface.

8. The user interface system of claim 1, wherein:
   the user interface surface comprises a flexible plastic top layer;
   the user interface surface comprises a rubber underside; and
   the strike sensor is embedded within the rubber underside.

9. The user interface system of claim 1, wherein a force of a generated haptic feedback is based on a strength of the strike.

10. A method, comprising:
    identifying multiple regions on a user interface surface, wherein each region is associated with a different task;
    receiving data from multiple strike sensors disposed on an underside of the user interface surface;
    distinguishing, based on the data, between a movement of the user interface device along the user interface surface and a strike to the user interface surface;
    determining, based on the data, a region where a strike occurred; and
    generating haptic feedback responsive to a detected strike.

11. The method of claim 10, further comprising performing, based on the detected strike and the region where the detected strike occurred, a task associated with the region.

12. The method of claim 10, further comprising preventing a task associated with the region based on a detected movement of the user interface device along the user interface surface.

13. The method of claim 10, further comprising generating haptic feedback in the user interface surface based on an application running on a computing device to which the user interface surface is electrically coupled.

14. The method of claim 13, further comprising generating different strengths of haptic feedback in the user interface surface based on different characteristics of the application running on the computing device.

15. The method of claim 10, wherein performing a task associated with the region, comprises emulating at least one of a keyboard command and a mouse command to a computing device to which the user interface surface is electrically coupled.

16. The method of claim 10, further comprising distinguishing, based on the data, between a strike by a mouse along the user interface surface and a strike by a user finger against the user interface surface.

17. The method of claim 10, wherein distinguishing, based on the data, between the movement of the user interface device along the user interface surface and the strike to the user interface surface is based on:

a strength of a force;

a pattern of the force;

a surface area of the force; and a length of time the force is applied.

18. The method of claim 10, wherein the haptic feedback is generated responsive to a received audio signature.

19. A non-transitory machine-readable storage medium encoded with instructions executable by a processor, the machine-readable storage medium comprising:

instructions to identify multiple regions on a mouse pad, wherein each region is associated with a different task;

instructions to receive data from multiple strike sensors disposed on an underside of the mouse pad;

instructions to distinguish, based on the data, between a movement of a user interface device along the mouse pad and a strike to the mouse pad;

instructions to determine, based on the data, a region of the multiple regions where the strike occurred based on a relative voltage value received by each of the multiple strike sensors and a timing of received voltage values; and instructions to generate haptic feedback responsive to a detected strike.

20. The non-transitory machine-readable storage medium of claim 19, wherein the non-transitory machine-readable storage medium further comprises instructions to receive user indication of tasks to associate with the multiple regions.

* * * * *